United States Patent [19]
Endoh

[11] Patent Number: 5,253,120
[45] Date of Patent: Oct. 12, 1993

[54] RECORDING/REPRODUCING APPARATUS FOR MORE EFFICIENT RECORDING AND REPRODUCTION OF AUDIO AND VIDEO SIGNALS

[75] Inventor: Naoki Endoh, Yokohama, Japan

[73] Assignee: Kabushiki Kaisha Toshiba, Kawasaki, Japan

[21] Appl. No.: 501,717

[22] Filed: Mar. 30, 1990

[30] Foreign Application Priority Data

Mar. 31, 1989 [JP]  Japan ................................. 1-83595

[51] Int. Cl.$^5$ .............................................. H04N 5/78
[52] U.S. Cl. ................................ 360/19.1; 360/35.1; 360/33.1; 358/343; 358/335
[58] Field of Search ...................... 360/10.1, 10.3, 19.1, 360/14.1, 35.1, 32, 33.1; 358/343, 335, 311, 310, 312, 906

[56] References Cited

U.S. PATENT DOCUMENTS

| | | | |
|---|---|---|---|
| 4,488,182 | 12/1984 | Takahashi et al. | 358/312 |
| 4,670,796 | 6/1987 | Kobayashi et al. | 358/310 |
| 4,672,480 | 6/1987 | Yamamoto | 360/32 |
| 4,709,275 | 11/1987 | Fukuda | 358/310 |
| 4,772,962 | 9/1988 | Tanaka et al. | 360/10.1 |
| 4,873,583 | 10/1989 | Kobayashi et al. | 358/310 |
| 4,947,271 | 8/1990 | Nakayama et al. | 360/19.1 |
| 4,994,925 | 2/1991 | Yamashita et al. | 358/343 |
| 5,130,860 | 7/1992 | Nagashima et al. | 360/19.1 |

FOREIGN PATENT DOCUMENTS

| | | |
|---|---|---|
| 0287316 | 10/1988 | European Pat. Off. |
| 63-58690 | 3/1988 | Japan ................................. 360/73.04 |
| 2196505 | 4/1988 | United Kingdom . |

OTHER PUBLICATIONS

ITEJ Technical Report, vol. 13, No. 50, VIR 89-12, pp. 1-6, R. Tsunoi et al.; Oct. 1989.

*Primary Examiner*—Andrew L. Sniezek
*Attorney, Agent, or Firm*—Oblon, Spivak, McClelland, Maier & Neustadt

[57] ABSTRACT

A recording/reproducing apparatus includes a video memory having a capacity of at least one frame, a video processor for recording movie image data on a first track of a recording medium via the video memory, and for reproducing movie image data recorded on the first track of the recording medium via the video memory, an audio processor for recording at least one of audio data input via an input terminal and still image data constructed by movie image data selectively read out from the video memory into a plurality of channels of a second track of the recording medium, and for reproducing data recorded in the plurality of channels of the second track and a buffer for writing the reproduced still image data from the second track of the recording medium into the video memory.

15 Claims, 6 Drawing Sheets

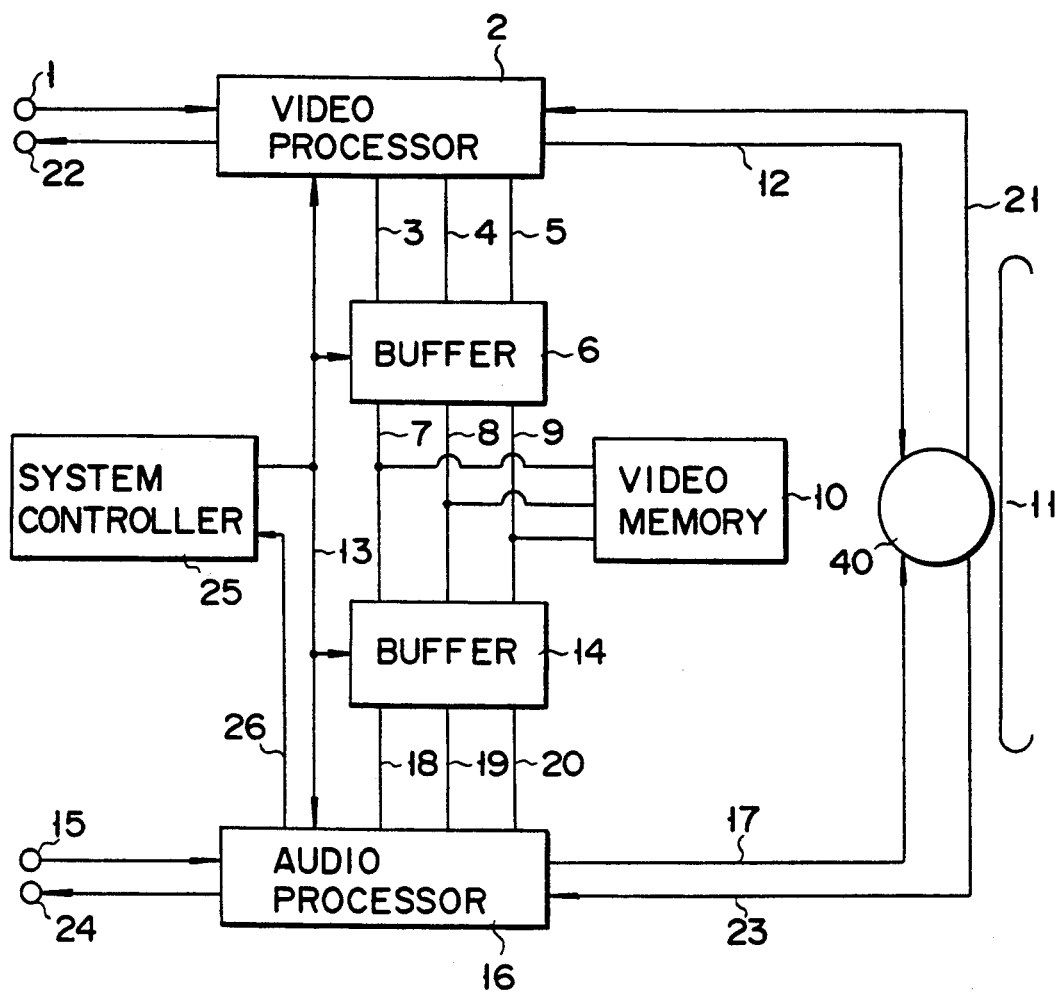
F I G. 1

RECORDING/REPRODUCING APPARATUS FOR MORE EFFICIENT RECORDING AND REPRODUCTION OF AUDIO AND VIDEO SIGNALS

BACKGROUND OF THE INVENTION

1. Field of the Invention

This invention relates to a recording/reproducing apparatus for recording/reproducing video data and other data such as digital audio data by use of the same recording medium.

2. Description of the Related Art

A technique for recording/reproducing video data and digital audio data by use of the same recording medium has been practically used in VTRs, video disk devices and the like. In the conventional recording/reproducing apparatus, the video data channels and the digital audio data channels are completely separated from each other.

Therefore, even when the video data channel has a video memory of large capacity, the video memory is only used for processing video data recorded/reproduced via the video data channel, and thus the hardware is not effectively used.

The digital audio data channel is provided to simultaneously record/reproduce multi-channel audio data of four or more channels, but in some applications of the apparatus, two-channel audio data may be sufficiently used to serve a desired purpose. In this case, the remaining audio data channels are not effectively used.

As described above, in the prior art, the large-capacity video memory provided for the video data channel is not effectively used, and the digital audio data channel capable of simultaneously recording reproducing the multi-channel audio data has a problem that when the number of channels to be used is reduced, the remaining channels are not effectively used.

SUMMARY OF THE INVENTION

An object of this invention is to provide a recording/reproducing apparatus capable of effectively using the large-capacity video memory and digital audio channel, thus enlarging the application field.

According to this invention, there is provided a recording/reproducing apparatus for recording/ reproducing video data by use of a first track of a recording medium via a video memory and recording/ reproducing digital audio data mainly by use of a plurality of channels of a second track of the recording medium, and particularly, the recording/reproducing apparatus comprises a buffer memory for recording, on the second track of the recording medium, data input to an input terminal and data read out from a video memory; means for writing a signal reproduced from the second channel of the recording medium; and means for outputting the signal via an output terminal.

Further, according to this invention, there is provided a recording/reproducing apparatus for recording/ reproducing video data by use of a first channel of a recording medium via a video memory and recording/ reproducing, for example, digital audio data mainly by use of a second channel of the recording medium, and the recording/reproducing apparatus effects data inputting/ outputting operation between the second channel and video memory and can directly input digital data between the video memory and the exterior.

Not only audio data which is input via the input terminal from the exterior but also data such as still image data created by use of the video memory can be recorded on a plurality of second channels which are the digital audio channels. Therefore, in a case where the digital audio data channels have a capacity corresponding to 4 channels, for example, it becomes possible to record digital audio data on the two channels and other data such as still image data on the remaining two channels, thus making it possible to effectively use the large-capacity video memory and the recording medium and enlarge the application range of the apparatus.

Not only audio data which is input via the input terminal from the exterior but also data such as still image data created by use of the video memory can be recorded on the second channel used as the digital audio data channel. Further, since digital data can be directly input/output with respect to the video memory, it becomes possible to record/reproduce digital still image data and other data supplied from the exterior. In this case, since the contents of the video memory can be output as the video data, it becomes possible to confirm the contents.

BRIEF DESCRIPTION OF THE DRAWINGS

FIG. 1 is a block circuit diagram of a recording/reproducing apparatus according to one embodiment of this invention;

DETAILED DESCRIPTION OF THE PREFERRED EMBODIMENTS

Figure 2:
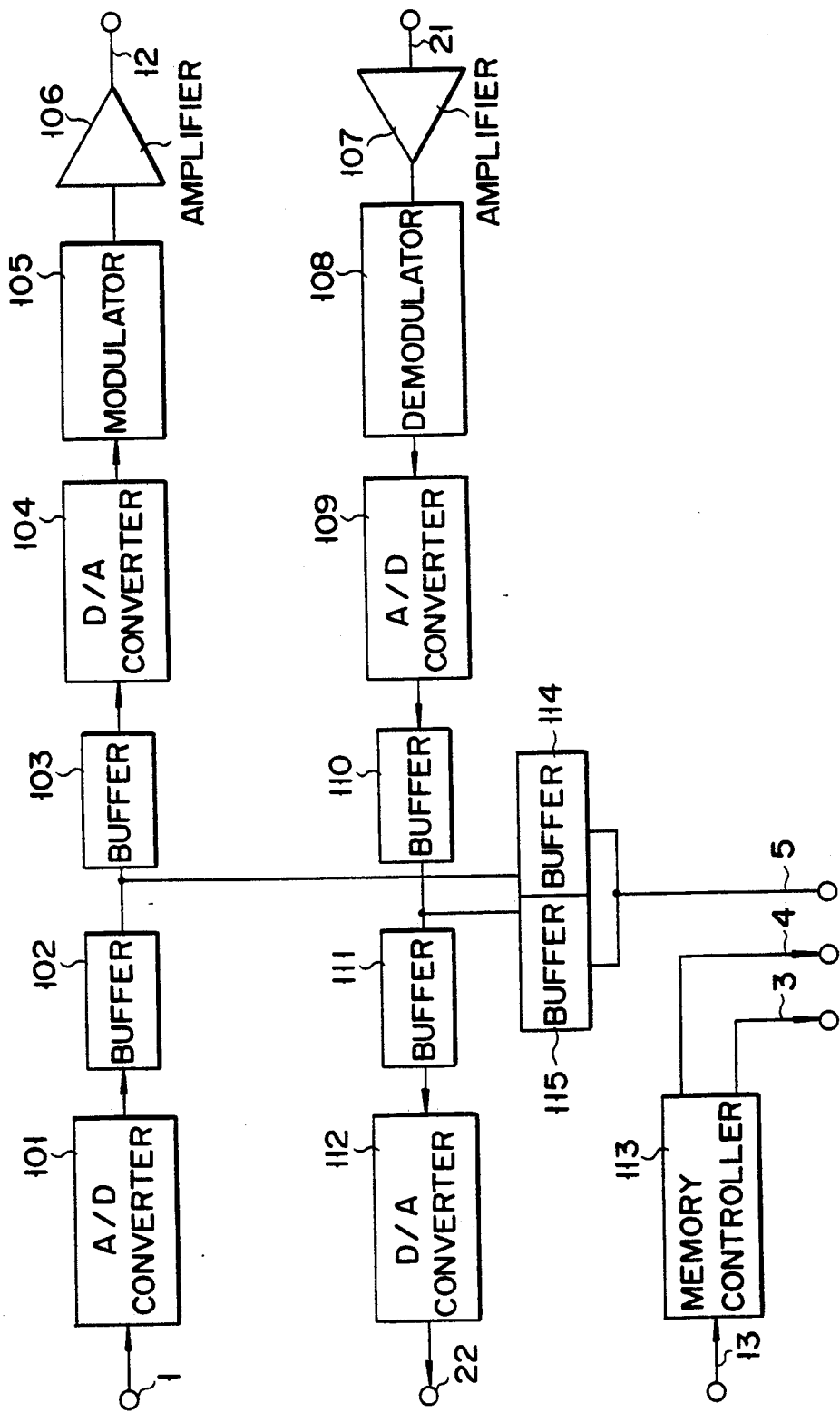
FIG. 2 is a block circuit diagram of a video processor shown in FIG. 1.

As shown in FIG. 1, a video input terminal 1 to which a video signal is input is connected to a video processor 2. The video processor 2 processes the input video signal and converts the same into a signal which can be adequately recorded into the recording medium 11.

The video processor 2 is connected to one terminal of a buffer 6 via an address bus 3, control bus 4 and data bus 5. The other terminal of the buffer 6 is connected to a video memory 10 via an address bus 7, control bus 8 and data bus 9. The video memory 10 adequately distributes picture elements constituting video data from the buffer 6 onto the recording medium 11 of two-dimensional plane such as a tape and disk, and writes/reads video data to suppress disorder of the video data due to medium defect or the like.

Now, the video processor 2 is explained in detail with reference to FIG. 2.

Figure 4:
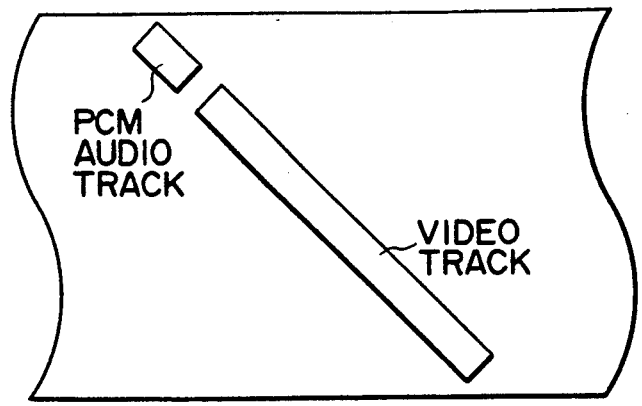
FIG. 4 is a diagram showing a recording medium.

The video input terminal 1 is connected to an A/D converter 101 so as to permit an input video signal to be converted into digital video data. An output terminal of the A/D converter 101 is connected to the video memory 10 via buffers 102 and 114, data bus 5, buffer 6 and data bus 9 shown in FIG. 1 so as to permit the digital video data to be written into the video memory 10. The video data read out from the video memory 10 is supplied to the video processor 2 via the data bus 9 and buffer 6 and received by the same, and at the same time, the video data is input to a D/A converter 104 via the buffers 114 and 103. The D/A converter 104 converts the digital video data into an analog video signal. The analog video signal is input to a recording head 40 via a modulation circuit 105, amplifier 106 and signal line 12 so as to be recorded on the video data channel of the recording medium 11, for example, on the video track shown in FIG. 4. At this time, the buffer 6 is set into a conductive state by a control signal input via a signal line 13 from a system controller 25 and the buffer 14 is set into a non-conductive state.

A memory controller 113 is provided to supply address data and various control signals to the video memory 10 via the address bus 3 and control bus 4, and the buffer 6.

An audio input terminal 15 is connected to an audio processor 16 to supply an input audio signal to the audio processor 16. The audio processor 16 processes the input audio signal, converts the same into a signal which can be easily recorded on the recording medium 11, and causes the converted signal to be recorded on the digital audio data channel of the recording medium, for example, on the PCM audio track shown in FIG. 4.

Now, the audio processor 16 is explained in detail with reference to FIG. 3.

The audio input terminal 15 is connected to an A/D converter 201 so as to permit input audio data to be converted into a digital signal. An output terminal of the A/D converter 201 is connected to a multiplexer 205 via buffers 202 and 203 to combine the digital audio signal with sub-code data from a sub-code processing circuit 204. The sub-code data is additional data including data for representing that the input data is video or audio data.

An output terminal of the multiplexer 205 is connected to an error correction encoder 206, modulation circuit 207 and amplifier 208. The error correction encoder 206 converts the combined signal into data of Reed-Solomon code, for example. The modulation circuit 207 modulates coded data and outputs the modulated signal to the amplifier 208. The modulated signal amplified by the amplifier 208 is recorded in the audio data channel on the recording medium 11.

With the above construction, the video data stored in the video memory 10 can be recorded in part of the digital data channel of the recording medium 11 as still image data.

The system controller 25 is connected to the buffers 6 and 14 via the signal line 13 to supply a control signal to the buffers 6 and 14. The buffers 6 and 14 are respectively set into the conductive and non-conductive states in response to the control signal.

The audio processor 16 is connected to the video memory 10 via an address bus 18, control bus 19, data bus 20, buffer 14, address bus 7, control bus 8 and data bus 9 to access the video memory 10 and fetch preset data from the video memory 10. The audio processor 16 is connected to the system controller 25 and receives an instruction of the way of using the signal audio data channel in response to a control signal supplied from the controller 25 via the signal line 13. For example, when it is indicated from the instruction that the audio track has a capacity of 4-audio channels, the audio processor 16 records audio data in the two channels of the recording medium 11 and records still image data in the remaining two channels, for example.

Figure 3:
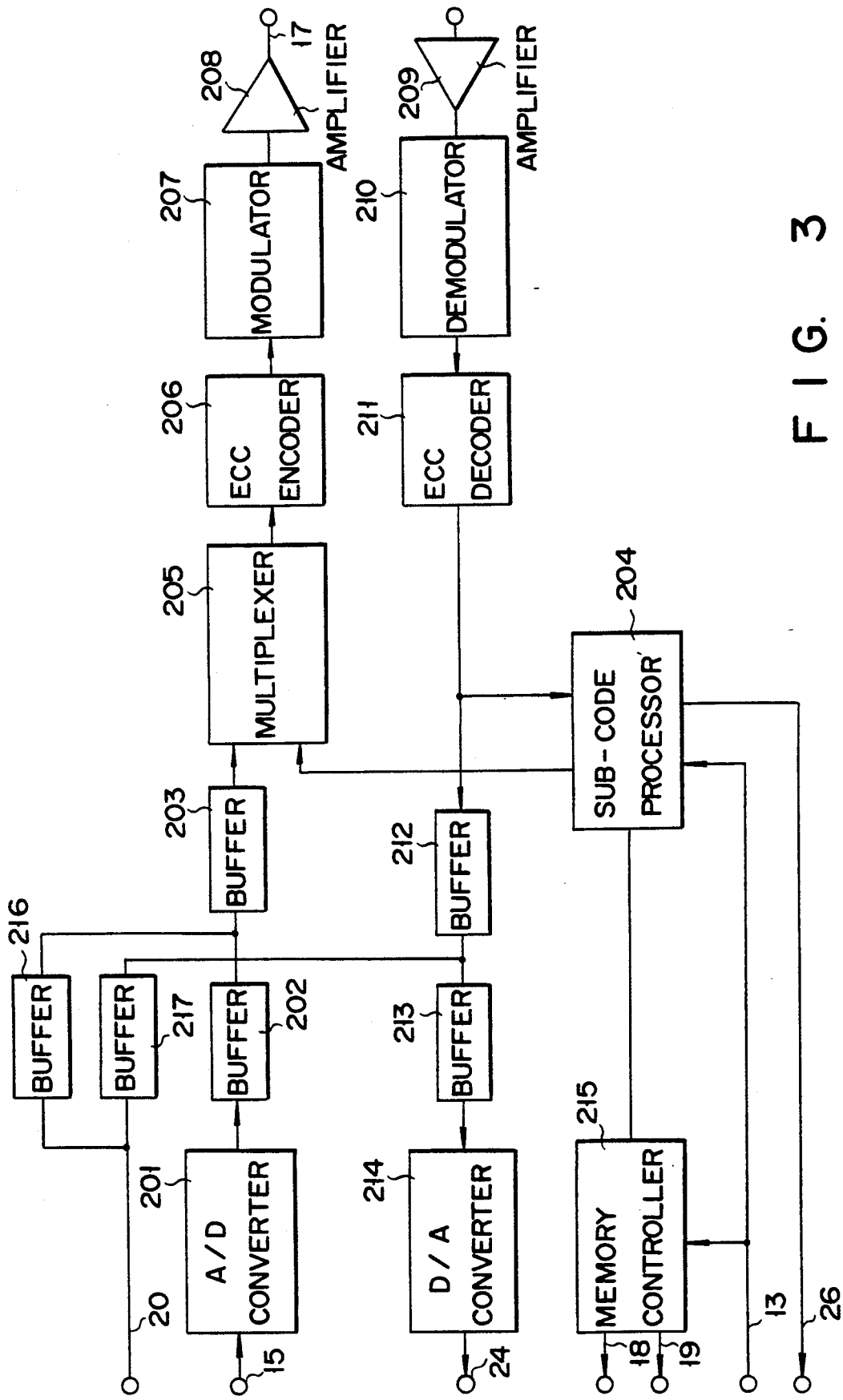
FIG. 3 is a block circuit diagram of an audio processor shown in FIG. 1.

Still image data read out from the video memory 10 is supplied to the audio processor 16 shown in FIG. 3 via the data bus 9, buffer 14 and data bus 20 and received by the same. In the audio processor 16, buffers 216 and 217 are connected to the data bus 20. Therefore, the received still image data is input to the multiplexer 205 via the buffers 216 and 203 and combined with sub-code data from the sub-code processing circuit 204 in the same manner as in the case of the digital audio data. After this, the still image data is output to the signal line 17 via the error correction encoder 206, modulation circuit 207 and amplifier 208 and recorded in the remaining two channels which are included in the digital data channels of the recording medium 11 and is not used for recording the audio data.

In general, the digital audio data channel can record ID data, sub-code data and the like in addition to audio data. Therefore, in the recording operation, the way of using the digital audio data channel can be recorded as one of the sub-code data items. In the reproducing operation, the contents of the digital audio data channel can be correctly identified by using the above recorded data.

In the above explanation, the recording-side circuit is explained, and the reproducing-side circuit is explained below. Video signals recorded in the video data channel of the recording medium 11 are reproduced by means of a magnetic head 40. The output terminal of the head 40 is connected to the input terminal of an amplifier 107 via a signal line 21. The output terminal of the amplifier 107 is connected to the data bus 5 via a demodulation circuit 108, A/D converter 109, and buffers 110 and 115. Therefore, a reproduced signal from the video channel of the recording medium 11 is supplied to the amplifier 107 shown in FIG. 2 via the signal line 21 and amplified, demodulated by means of the demodulation circuit 108, and then converted into digital video data by the A/D converter 109. The digital video data is output to the data bus 5 via the buffers 110 and 115 and written into the video memory 10 via the buffer 6 and data bus 9 of FIG. 1.

The video data written into the video memory 10 as described above is read out and again received by the video processor 2 via the data bus 9, buffer 6 and data bus 5, input to an A/D converter 112 via the buffers 115 and 111 shown in FIG. 2 and converted into an analog signal which is output to the video output terminal 22 as a video signal. In this case, the buffers 6 and 14 are respectively set into the conductive and nonconductive states by a control signal supplied from the system controller 25 via the signal line 13.

The reproduced signal from the digital audio data channel of the recording medium 11 is input to the audio processor 16 shown in FIG. 3 via a signal line 23. In the audio processor 16, the input terminal of an amplifier 209 is connected to the signal line 23 and the reproduced signal is amplified by the amplifier 209. The output terminal of the amplifier 209 is connected to the input terminal of a demodulator circuit 210 to demodulate the amplified reproduced signal. The output terminal of the demodulator circuit 210 is connected to an error correction decoder 211 and the demodulated signal is decoded by the error correction decoder 211. The decoded signal is input to the sub-code processing circuit 204 which in turn decodes the contents of sub-code data included in the reproduced signal and then separates audio data and still image data in the reproduced signal from each other based on the decoding result. The audio data among the items of the above data is input to a D/A converter 214 via buffers 212 and 213 and converted into an analog signal which is then output as audio data via the audio output terminal 24. Still image data is output via the buffer 217 and data bus 20 and supplied to the video memory 10 via the buffer 14 shown in FIG. 1.

At this time, the decoding result of the sub-code data obtained by the sub-code processing circuit 204 is output from the audio processor 16 shown in FIG. 3 via the signal line 26 and supplied to the system controller 25 of FIG. 1. The system controller 25 controls the operations of the memory controller 113 in the video processor 2, the memory controller 215 in the audio processor 16 and the buffers 6 and 14 via the signal line 13 based on the above decoding result and the instruction from the exterior of the apparatus. The control operation is effected according to video data output from the video output terminal 22 specifically as described below:

When data of the video data channel is selected;
buffer 6: conductive state
buffer 14: non-conductive state
memory controller 113: update the content of the video memory 10 by use of a reproduced signal from the signal line 21.

When the digital audio data channel is selected;
reception of data from the audio processor 16:
buffer 6: non-conductive state
buffer 14: conductive state
output of still image data
buffer 6: conductive state
buffer 14: non-conductive state
memory controller 215: keep the content of the video memory 10 unchanged.

As described above, part of the digital audio data channels can be used to record/reproduce data other than the audio data, for example, still image data.

According to the above embodiment, in a recording/ reproducing apparatus such as a VTR having a plurality of digital data channels on the recording medium, part of the digital data channels can be used to record/ reproduce data other than signal audio data, for example, still image data defined by the video memory in the apparatus in a case where part of the digital data channels on the recording medium is not used. Therefore, the function and application of the apparatus can be enhanced while increase in the hardware scale is suppressed, thus providing a significant effect in practice.

Figure 5:
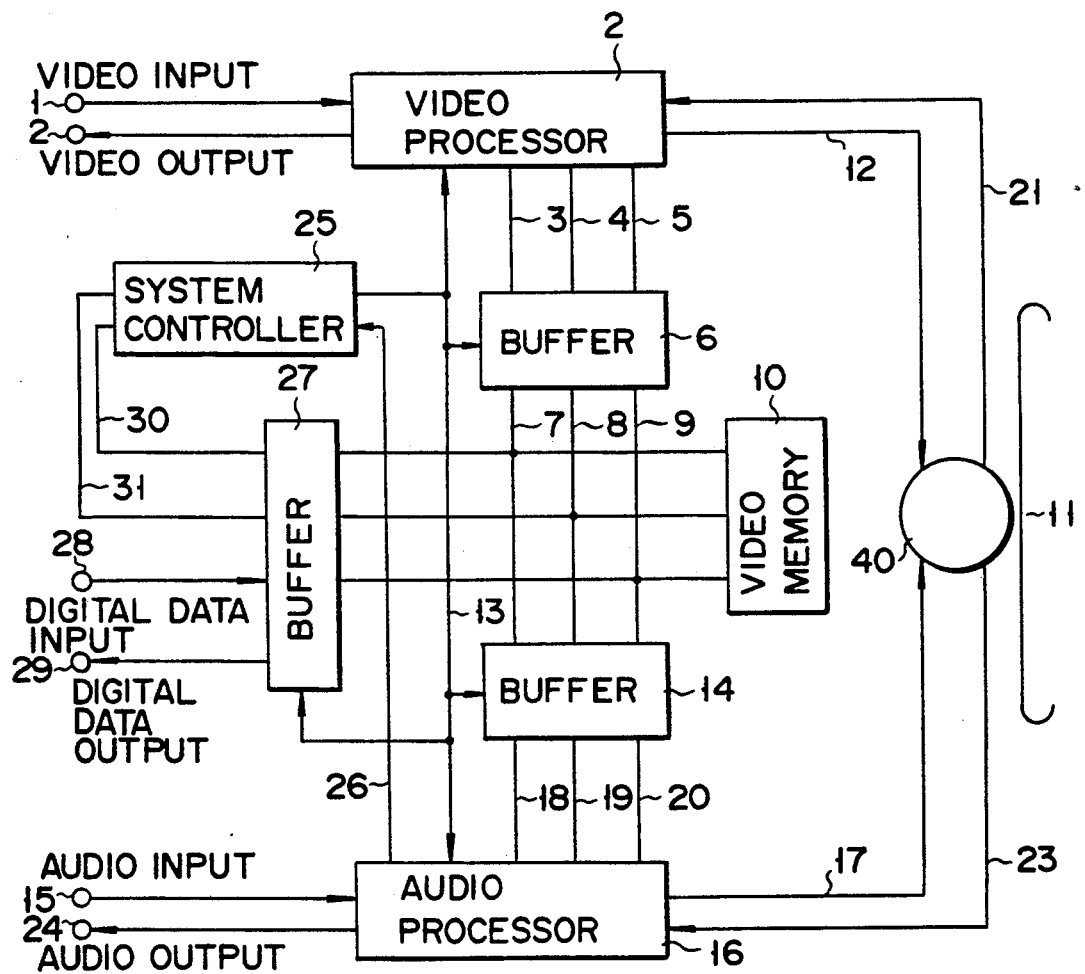
FIG. 5 is a block circuit diagram of a recording/reproducing apparatus according to another embodiment of this invention.

Next, another embodiment of this invention is explained with reference to FIG. 5.

This embodiment is basically the same as the former embodiment, but according to this embodiment, a buffer 27 is connected between the system controller 25 and video memory 10. Further, the buffer 27 is connected to a digital data input terminal 28 for receiving digital data from the exterior and a digital data output terminal 29 for outputting digital data to the exterior.

According to the embodiment of FIG. 5, video data stored into the video memory 10 as will be described below can be recorded as still data in the digital audio data channels on the recording medium 11.

(1) In the process of recording/reproducing video data, buffers 6 and 27 are set into the non-conductive state and a buffer 14 is set into the conductive state at a preset timing by a control signal input from the system controller 25 via a signal line 13. An audio processor 16 accesses the video memory 10 via an address bus 18, control bus 19, data bus 20, buffer 14, address bus 7, control bus 8 and data bus 9, and receives preset data from the video memory 10.

(2) Digital video data is input to the buffer 27 via the terminal 28. At this time, the buffer 27 is set into the conductive state and the buffers 6 and 14 are set into the non-conductive state at a preset timing by a control signal input from the system controller 25 via the signal line 13. The system controller 25 controls the video memory 10 via the address buses 30 and 7 and the control buses 31 and 8 so as to write digital video data into the video memory 10 via the data bus 9. The method of transferring data from the video memory 10 to the audio processor 16 is effected in the same manner as in the case of (1). In this case, the digital video data input to the video memory 10 can be confirmed by use of a display device by outputting the content of the video memory 10 to the video output terminal 22 (output terminal shown in FIG. 1) via the video processor 2.

The content of the video memory 10 can be read out from the video memory 10 by various control signals (buses 31 and 8) and address data (buses 30 and 7) input to the video memory 10 from the system controller 25 via the buffer 27 and output via the data bus 9, buffer 27 and part or entire portion of the digital audio data channels.

As described above, part or entire portion of the digital audio data channels can be used to record/ reproduce data other than audio data, for example, still image data.

According to this invention, in a recording/ reproducing apparatus such as a VTR having digital audio data channels in addition to video data channels on the recording medium, part or entire portion of the digital data channels can be used for recording/reproducing data other than digital audio data, for example, still image data which is defined by the video memory in or outside the apparatus. Therefore, the function and application of the apparatus can be enhanced while increase in the hardware scale is suppressed, thus providing a significant effect in practice.

Figure 6:
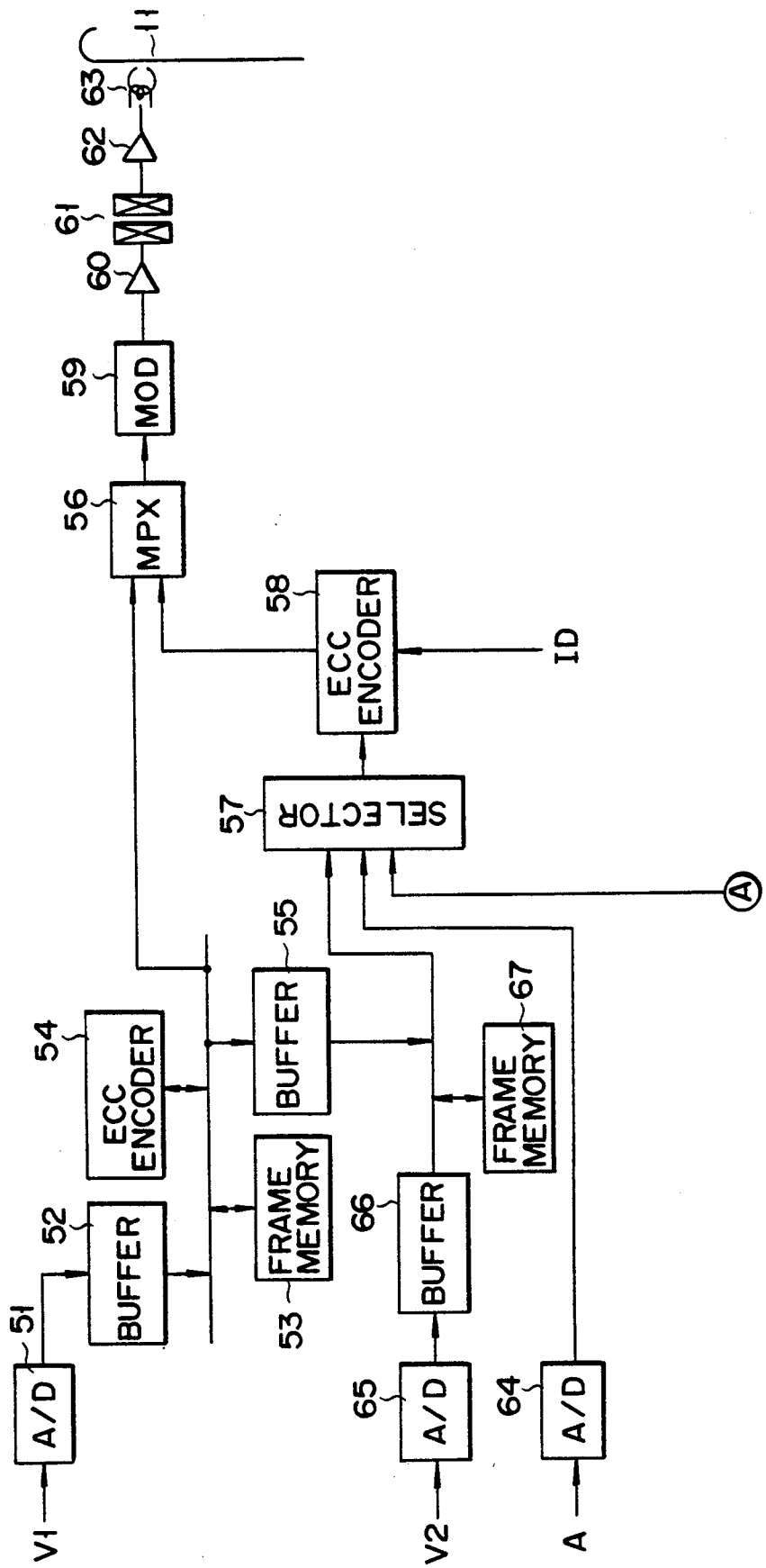
FIG. 6 is a block circuit diagram of a recording circuit section of a recording/reproducing apparatus according to another embodiment.
Figure 7:
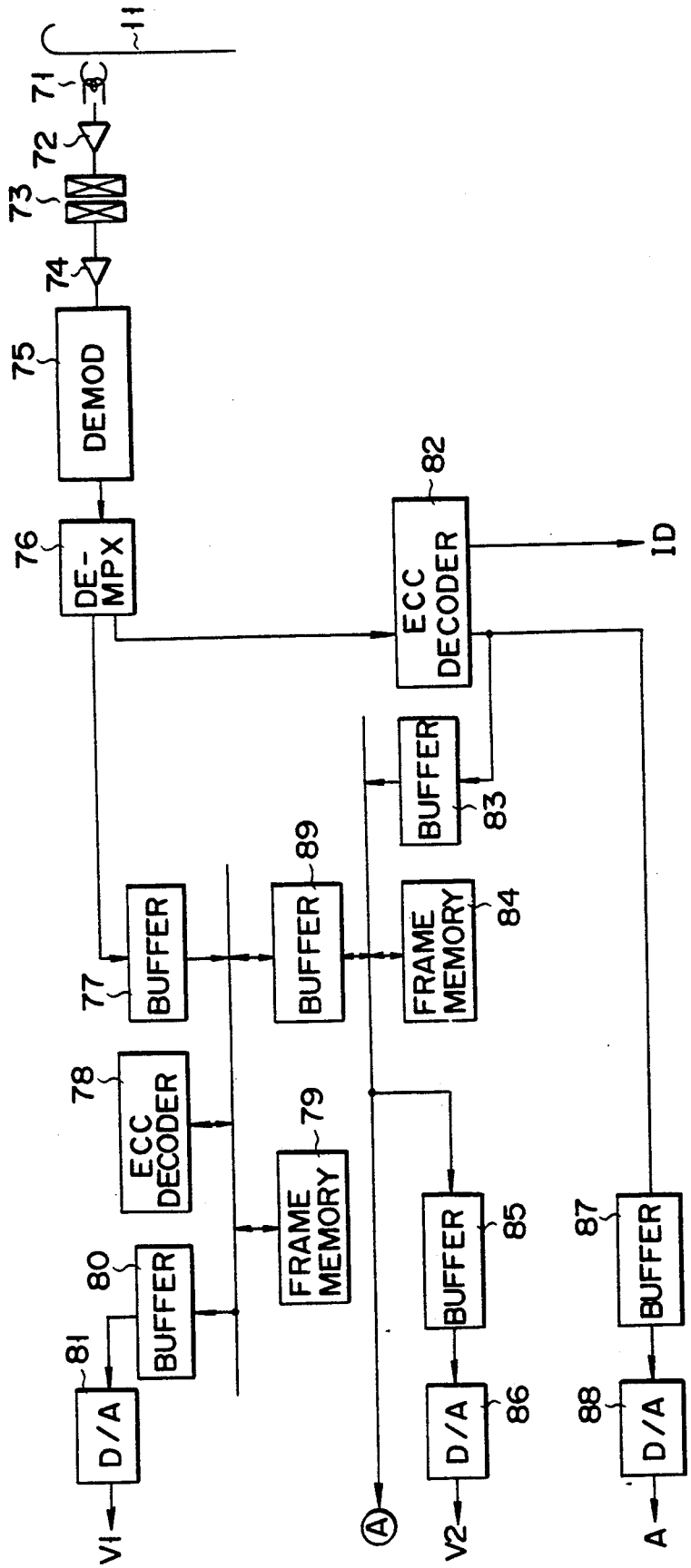
FIG. 7 is a block circuit diagram of a reproducing circuit section of the apparatus of FIG. 6.

Next, with referring to FIGS. 6 and 7, the operation in various modes is explained.

FIGS. 6 and 7 show a digital VTR for recording the video and audio signals in a digital form.

First, a first recording mode in which part of recorded movie or motion images is recorded as a still image on the audio channels is explained with reference to FIG. 6.

In effecting the first recording mode, the first mode is selected by operating a switch on a control panel (not shown). At this time, a movie or motion video signal V1 is converted into a digital video signal by means of an A/D converter 51 and then stored as video data into a frame memory 53 via a buffer 52. Video data read out from the frame memory 53 is coded by an error correction encoder 54 and then supplied to a multiplexer 56. At this time, video data read out from the frame memory 53 is selectively stored into a frame memory 67 via a buffer 55. That is, part of the movie image is stored as a still image into the frame memory 67. Still image data read out from the frame memory 67 is input to an error correction encoder 58 via a selector 57. At this time, if two-channel audio data which has been converted into a digital signal by an A/D converter 64 is supplied to the selector 57, still image data and audio data are selectively input to the error correction encoder 58. The error correction encoder 58 encodes the still image data and audio data and outputs coded still image data and audio data to the multiplexer 56. At this time, an ID code for identifying that the coded data is still image data or audio data is attached to the still image data and audio data by means of the error correction encoder 58.

The multiplexer 56 multiplexes movie image data supplied from the movie image system and still image data supplied from the still image system and outputs the multiplexed image data to a modulation circuit 59. Modulated image data is input to a recording head 63 via an amplifier 60, rotary transformer 61 and amplifier 62. The recording head 63 records the input movie image data on a video track V, records audio data in the two channels of an audio track A, and records still image data in the remaining two channels of the audio track.

As described above, audio data is recorded in the two channels of the audio track and at the same time part of movie images is recorded as a still image in the remaining channels of the audio track. Thus, the first recording mode is effected.

Next, a second recording mode in which a still image supplied from the exterior is recorded on the audio track is explained.

In the second recording mode, a still image signal V2 is converted into a digital image signal by an A/D converter 65, and the digital image signal is recorded as still image data into the frame memory 67 via a buffer 66. After this, externally supplied still image data read out from the frame memory 67 is input to the error correction encoder 58 via the selector 57, coded, and recorded together with an ID code into the remaining two channels of the audio track of the recording medium 11 via the multiplexer 56, modulation circuit 59, amplifier 60, rotary transformer 61, amplifier 62 and recording head 63 in the same manner as in the case of the first mode.

Next, a third recording mode in which part of a reproduced movie images is recorded as a still image into the audio track is explained.

In the third recording mode, as shown in FIG. 7, reproduced data reproduced from the recording medium 1 by a reproducing head 71 is input to a demultiplexer 76 via an amplifier 72, rotary transformer 73, amplifier 74 and demodulator 75. The demultiplexer 76 demultiplexes the reproduced data and outputs movie image data reproduced from the video track to a buffer 77. Movie image data in the buffer 77 is supplied to and decoded by an error correction decoder 78. The decoded movie image data is stored into a frame memory 79, and the movie image data read out from the frame memory 79 is input to a D/A converter 81 via a buffer 80. The D/A converter 81 converts the reproduced movie image data into an analog signal and outputs the reproduced image signal to the A/D converter 51 of the recording system shown in FIG. 6. In the circuit of FIG. 6, the reproduced signal is subjected to the same processing as in the mode 1 and part of the reproduced data is recorded as still image data into the remaining channels of the audio track. That is, part of the movie image data reproduced from the video track of the recording medium is recorded as a still image into the audio track.

The third recording mode can be realized as follows:

That is, in the above explanation, video data read out from the frame memory 79 is selectively stored into the frame memory 84 via the buffer 89. That is, part of the movie image is stored into the frame memory 84 as a still image. Still image data read out from the frame memory 84 is input to the selector 57 of FIG. 6 via the signal line A. The process in the succeeding stage of the selector 57 is effected in the same manner as in the first recording mode which has been described above so as to record part of the reproduced image data as still image data into the remaining channels of the audio track. That is, part of the movie image data reproduced from the video track of the recording medium is recorded as a still image into the audio track.

Next, a fourth recording mode in which still image data reproduced from the audio track is again recorded into the audio track is explained.

In the fourth recording mode, reproduced data reproduced from the recording medium 11 by the reproducing head 71 is input to the demultiplexer 76 via the amplifier 72, rotary transformer 73, amplifier 74 and demodulator 75 in the circuit of FIG. 7. The demultiplexer 76 demultiplexes the reproduced data, separates reproduced data from the video track and reproduced data from the audio track from each other, and then outputs the reproduced data of the audio track to an error correction decoder 82. The error correction decoder 82 identifies the audio data and still image data according to the ID code and inputs the reproduced still image data to a frame memory 84 via a buffer 83. The reproduced still image data read out from the frame memory 84 is input to a D/A converter 86 via a buffer 85, converted into an analog still image signal and then input to the A/D converter 65 shown in FIG. 6. In contrast, audio data is output to the A/D converter 64 of FIG. 6 via a buffer 87 and D/A converter 88.

The reproduced still image data input to the A/D converter 65 is converted into digital reproduced still image data and input to the selector 57 via the buffer 66 and frame memory 67. The reproduced still image data from the selector 57 is coded by the error correction encoder 58 and supplied to the recording head 63 via the multiplexer 56, modulation circuit 59, amplifier 60, rotary transformer 61 and amplifier 62. The recording head 63 records the reproduced still image data into the same track as or an audio track different from the audio track from which the reproduced still image data is reproduced. That is, in the fourth recording mode, the reproduced still image data reproduced from a preset audio track is recorded into the reproduced audio track or another audio track.

The fourth recording mode can be realized as follows:

That is, in the above explanation, reproduced still image data read out from the frame memory 84 is input to the selector 57 of FIG. 6 via the signal line A. The process in the succeeding stage of the selector 57 is effected in the same manner as in the first recording mode which has been described above so as to record the reproduced still image data as into the audio track. That is, still image data reproduced from a preset audio track of the recording medium is recorded into the audio track.

Next, a fifth recording mode in which a still image is recorded but a motion image is not recorded is explained.

In the fifth recording mode, still image data stored in the frame memory 53 or still image data input from the exterior and stored into the frame memory 67 is input to the recording head 63 via the selector 57, error correction encoder 58, multiplexer 56, modulator circuit 59, amplifier 60, rotary transformer 61 and amplifier 62, and then the still image data is recorded into the audio track of the recording medium 1 by the recording head 63.

Next, a sixth recording mode in which movie image is recorded is explained.

In the sixth recording mode, a movie or motion video signal V1 is converted into a digital video signal by the A/D converter 51 and stored as video data into the frame memory 53 via the buffer 52. Video data read out from the frame memory 53 is coded by the error correction encoder 54 and then supplied to the multiplexer 56. The multiplexer 56 outputs the movie image data to the modulation circuit 59. The modulated movie image data is input to the recording head 63 via the amplifier 60, rotary transformer 61 and amplifier 62. The recording head 63 records input movie image data on the video track.

In the sixth recording mode, an audio signal A is converted into digital audio data by the A/D converter 64 and input to the selector 57. Audio data from the selector 57 is input to the error correction encoder 58 and coded by the same. At this time, ID data for specifying audio data is attached to the audio data. The coded audio data is input to the recording head 63 via the multiplexer 56, modulator circuit 59, amplifier 60, rotary transformer 61 and amplifier 62. The recording head 63 records the input audio data on the audio track of the recording medium 11.

The recording modes have been explained above, and now the reproducing mode is explained below.

First, a first reproducing mode in which only still image data recorded on the audio track of the recording medium 11 is reproduced is explained.

In the first reproducing mode, still image data reproduced from the audio track of the recording medium 11 by the reproducing head 71 is input to the demultiplexer 76 via the amplifier 72, rotary transformer 73, amplifier 74 and demodulator 75. The still image data from the demultiplexer 76 is input to the error correction decoder 82 and decoded by the same. The decoded still image data is input to the frame memory 84 via the buffer 83. The still image data read out from the frame memory 84 is input to the D/A converter 86 via the buffer 85, converted into an analog still image signal.

In this way, still image data recorded on the audio track is reproduced and the reproduced data is supplied to a display unit, for example, and displayed thereon.

Next, a second reproducing mode in which a combination of still image data and movie image data is reproduced is explained.

In this mode, data reproduced from the reproducing medium 11 by the reproducing head 71 is input to the demultiplexer 76 via the amplifier 72, rotary transformer 73, amplifier 74 and demodulator 75. The demultiplexer 76 demultiplexes the reproduced data, separates reproduced movie image data from the video track and reproduced data from the audio track from each other, and outputs reproduced still image data from the audio track to the error correction decoder 82. The error correction decoder 82 identifies the audio data and still image data according to the ID code and inputs the reproduced still image data to the frame memory 84 via the buffer 83. The reproduced still image data read out from the frame memory 84 is stored into the frame memory 79 via the buffer 89 at a predetermining timing.

On the other hand, movie image data from the demultiplexer 76 is input to the buffer 77. The movie image data in the buffer 77 is supplied to the error correction decoder 78 and decoded by the same. The decoded movie image data is stored into the frame memory 79. In a timing at which the reproduced still image data is to be recorded, the recording of the decoded movie image data on the frame memory is inhibited. At this time, the still image data and movie image data are combined in the frame memory 79 along a time axis. Therefore, data read out from the frame memory 79 includes a combination of the still image data and movie image data and the combination of the still image data and movie image data is output as reproduced data via the buffer 80 and D/A converter 81.

Next, a third reproducing mode in which still image data is output to the movie image system while movie image data is not recorded on the recording medium 11 is explained.

In the third reproducing mode, still image data read out from the audio track of the recording medium 11 by the reproducing head 71 is supplied to the error correction decoder 82 via the amplifier 72, rotary transformer 73, amplifier 74, demodulator 75 and demultiplexer 76, and decoded by the error correction decoder 82. The decoded still image data is stored into the frame memory 79 via the buffer 83 and the buffer 89 of the movie image system. Still image data read out from the frame memory 79 is input to the D/A converter 81 via the buffer 80, converted into an analog still image signal and then displayed as a still image on a monitor, for example. That is, in this third reproducing mode, still image data recorded on the audio track is processed by the circuit of the movie image system and displayed as a still image on the movie image monitor.

Next, a fourth reproducing mode in which movie image is reproduced is explained.

Movie image data read out from the video track of the recording medium 11 is input to the buffer 77 via the amplifier 72, rotary transformer 73, amplifier 74, demodulator 75 and demultiplexer 76. Movie image data output from the buffer 77 is supplied to the error correction decoder 78, decoded and then stored into the frame memory 79. The decoded movie image data stored in the frame memory 79 is input to the D/A converter 81 via the buffer 80, converted into an analog movie image signal and then displayed as a movie or motion image on the motion image monitor.

Next, a fifth reproducing mode in which audio data is reproduced is explained.

Audio data read out from the audio track of the recording medium 11 is input to the error correction decoder 82 via the amplifier 72, rotary transformer 73, amplifier 74, demodulator 75 and demultiplexer 76, and decoded by the error correction decoder 82. The decoded audio data is input to the D/A converter 88 via the buffer 87 and converted into an analog audio signal. The audio signal is input to an audio device and output as sound.

What is claimed is:

1. A recording and reproducing apparatus for recording and reproducing data with respect to a recording medium having first and second tracks having a plurality of channels, comprising:
   a video memory having a capacity of at least one frame;
   data receiving means for receiving movie image data;
   digital data output means for outputting digital audio data and digital still image data different from the movie image data;

means for selectively outputting first and second mode signals, the first mode signal being used for designating recording and reproducing of the movie image data and digital audio data, and the second mode signal being used for designating the recording and reproducing of the movie image data, digital audio data and digital still image data;

first recording means for recording the movie image data onto the first track of said recording medium via said video memory, and the digital audio data onto the channels of the second track in response to the first mode signal in a recording mode;

first reproducing means for producing the movie image data recorded onto the first track of said recording medium via said video memory, and the digital audio data recorded onto the channels of the second track in response to the first mode signal in a reproducing mode;

second recording means for recording the digital audio data and the digital still image data input from said digital data output means onto the channels of said second track of said recording medium, and for recording the movie image data onto the first track in response to the second mode signal in the recording mode, the digital audio data being data input to said digital data output means;

second reproducing means for reproducing the digital audio data and the digital still image data recorded onto the channels of said second track, and for reproducing the movie image data from the first track in response to the second mode signal in the reproducing mode; and means for writing the digital still image data reproduced from said second track of said recording medium into said video memory.

2. A recording and reproducing apparatus according to claim 1, wherein said second recording means includes buffer means for recording video data selectively read out from said video memory as digital still image data; and means for recording digital still image data read out from said buffer means and digital audio data input via said digital data output means into the plurality of channels of said second track.

3. A recording and reproducing apparatus according to claim 2, further comprising means for multiplexing said video data, digital still image data and digital audio data.

4. A recording and reproducing apparatus according to claim 2, wherein said second recording means includes means for adding ID data items respectively specifying the digital still image data and digital audio data to digital still image data and digital audio data, respectively.

5. A recording and reproducing apparatus according to claim 2, wherein said second recording means includes means for subjecting the digital still image data and digital audio data to an error correction encoding process.

6. A recording and reproducing apparatus according to claim 1, wherein said first and second recording means include recording head means for recording video data, still image data and audio data on said recording medium.

7. An apparatus according to claim 1, wherein said means for outputting digital audio data and digital still image data comprises means for receiving external digital audio data and external digital still image data and outputting them.

8. An apparatus according to claim 1, wherein said means for outputting digital audio data and digital still image data comprises means for receiving an external analog audio signal and an external still image signal and means for converting the analog audio signal and the analog still image signal into digital audio data and digital still image data and outputting them.

9. A recording and reproducing apparatus for recording and reproducing data by sue of a recording medium including a first track and a second track which has a plurality of channels, comprising:

video memory means having a capacity of at least one video frame;

first input/output terminal means for receiving movie image data and outputting reproduced movie image data;

first input/output means for inputting and outputting movie image data between said first input/output terminal means and the first track of said recording medium via said video memory means;

second input/output terminal means for receiving digital audio data and outputting reproduced digital audio data;

second input/output means for inputting and outputting digital audio data between said second input/output terminal means and preset channels of the second track of said recording medium;

third input/output terminal means for receiving digital still image data and outputting reproduced digital still image data; and third input/output means for inputting and outputting the digital still image data between said third input/output terminal means, said video memory means and remaining channels of the second track of said recording medium other then said preset channels;

means for selectively outputting first and second mode signals, the first mode signal being used for designating recording and reproducing of the movie image data and digital audio data, and the second mode signal being used for designating the recording and reproducing of movie image data, digital audio data and digital still image data;

said first and second input/output means including means for recording and reproducing, respectively, the movie image data and the digital audio data onto and from the first track and the preset channels of the second track in response to the first mode signal; and said first, second, and third, input/output means including means for recording and reproducing, respectively, the movie image data, the digital audio data, and the digital still image data onto and from the first track, the preset channels of the second track, and the remaining channels of the second track other than the preset channels in response to the second mode signal.

10. A recording nd reproducing apparatus according to claim 9, wherein said first input/output means includes means for writing movie image data into said video memory means and reading out the written movie image data; and recording means for recording movie image data read out from said video memory means on the first track of said recording medium.

11. A recording and reproducing apparatus according to claim 9, wherein said second input/output means includes means for subjecting digital audio data input via said second input/output terminal means to an error correction encoding process; and, means for recording coded digital audio data from said means for subjecting the digital audio data input via said second input/output terminal means to an error correction encoding process on the second track of said recording medium.

12. A recording and reproducing apparatus according to claim 9, wherein said third input/output means includes buffer means for storing digital still image data input via said third input/output terminal means; and means for writing digital still image data of said buffer means into said video memory means.

13. A recording and reproducing apparatus for recording and reproducing data with respect to a recording medium having first and second tracks, said first and second tracks having a plurality of channels, comprising:

digital data output means for outputting a digital audio signal and digital still image data;

video memory means having a capacity of at least one video frame;

first recording means, having a first input terminal, for recording movie image data input to said first input terminal onto the first track of said recording medium via said video memory means;

first output means, having a first output terminal, for reproducing the movie image data recorded onto the first track of said recording medium via said video memory means and outputting the reproduced movie image data to said first output terminal;

second recording means for recording the digital audio data and the digital still image data input from said digital data output means onto the channels of the second track of said recording medium;

means for reproducing the digital audio data and the digital still image data recorded onto the second track of said recording medium;

means for inputting the digital still image data reproduced from the second track of said recording medium to said video memory means;

means, having a second output terminal, for outputting the digital audio data and the digital still image data reproduced from the second track of said recording medium to said second output terminal;

means, having a second input terminal, for inputting digital data, input to said second input terminal, to said video memory means;

means, having a third output terminal, for outputting an output of said video memory means to said third output terminal;

means for selectively outputting first and second mode signals, the first mode signal being used for designating recording and reproducing of the movie image data and digital audio data, and the second mode signal being used for designating the recording and reproducing of the movie image data, digital audio data and digital still image data;

said first and second recording means recording the movie image data and the digital audio data in response to the first mode signal, and recording the movie image data, the digital audio data, and the digital still image data in response to the second mode signal; and wherein said first and second reproducing means reproduce the movie image data and the digital audio data in response to the first mode signal, and reproduce the movie image data, the digital audio data, and the digital still image data in response to the second mode signal.

14. An apparatus according to claim 13, wherein said means for outputting digital audio data and digital still image data comprises means for receiving an external digital audio data and external digital still image data and outputting them.

15. An apparatus according to claim 13, wherein said means for outputting digital audio data and digital still image data comprises means for receiving an external analog audio signal and an external still image signal and means for converting the analog audio signal and the analog still image signal into digital audio data and digital still image data and outputting them.

* * * * *